(12) United States Patent
Teng et al.

(10) Patent No.: US 9,421,840 B1
(45) Date of Patent: Aug. 23, 2016

(54) SUSPENSION MECHANISM

(71) Applicant: MOTIVE POWER INDUSTRY CO., LTD., Dacun Township (TW)

(72) Inventors: Ching-Chung Teng, Dacun Township (TW); Hsin-Lin Cheng, Dacun Township (TW)

(73) Assignee: MOTIVE POWER INDUSTRY CO., LTD. (TW)

( * ) Notice: Subject to any disclaimer, the term of this patent is extended or adjusted under 35 U.S.C. 154(b) by 31 days.

(21) Appl. No.: 14/703,197

(22) Filed: May 4, 2015

(51) Int. Cl.
*B60G 15/12* (2006.01)

(52) U.S. Cl.
CPC ..................................... *B60G 15/12* (2013.01)

(58) Field of Classification Search
CPC ...... B60G 15/12; B60G 17/08; B60G 13/003; B60G 13/005; B60G 21/02; B60G 21/073; B60G 2202/154; B60G 2202/24
See application file for complete search history.

(56) References Cited

U.S. PATENT DOCUMENTS

| | | | | |
|---|---|---|---|---|
| 4,607,861 A * | 8/1986 | Eisenberg | ........... | B60G 17/0424 267/186 |
| 5,110,153 A * | 5/1992 | Kallansrude | ....... | B60G 17/0152 180/209 |
| 5,171,036 A * | 12/1992 | Ross | ......... | B60G 7/04 280/124.116 |
| 5,217,245 A * | 6/1993 | Guy | ................... | B60G 21/0556 280/124.152 |
| 5,509,675 A * | 4/1996 | Barnett | ................... | B62K 25/08 188/269 |
| 6,024,366 A * | 2/2000 | Masamura | ......... | B60G 17/0416 267/217 |
| 6,371,263 B1 * | 4/2002 | Hoose | ...................... | B60G 3/01 188/312 |
| 6,556,907 B1 * | 4/2003 | Sakai | ..................... | B60G 21/06 280/124.1 |
| 6,615,960 B1 * | 9/2003 | Turner | ................... | F16F 9/062 188/286 |
| 6,742,775 B2 * | 6/2004 | Oldenettel | ............. | B60G 15/12 267/122 |
| 7,617,881 B2 * | 11/2009 | Radke | .................. | B60G 21/073 172/810 |
| 8,403,115 B2 * | 3/2013 | Gartner | .................. | B60G 15/12 188/297 |
| 2006/0083586 A1 * | 4/2006 | Fuller | .................. | B60G 13/003 403/408.1 |
| 2008/0203631 A1 * | 8/2008 | Gartner | ..................... | F16F 9/49 267/64.17 |

\* cited by examiner

*Primary Examiner* — Darlene P Condra
(74) *Attorney, Agent, or Firm* — Schmeiser, Olsen & Watts, LLP

(57) ABSTRACT

A suspension mechanism includes left and right external barrels whose upper ends have left and right ports and lower ends have left and right damper ports, respectively, wherein the left and right external barrels are pivotally connected to a chassis; left and right dampers with lower ends pivotally connected to left and right wheel support units pivotally connected to the chassis, respectively, wherein outer wall surfaces at the upper portions of the left and right dampers movably abut against inner wall surfaces at lower portions of the left and right external barrels through the left and right damper ports, with left and right adjustable spaces defined inside the left and right external barrels, and the left and right adjustable spaces communicating with the left and right ports and filled with oil, respectively; and a control valve connected to the left and right ports and adapted to control oil flow.

3 Claims, 3 Drawing Sheets

SUSPENSION MECHANISM

FIELD OF TECHNOLOGY

The present invention relates to suspension mechanisms, and more particularly, to a suspension mechanism capable of protecting a vehicle against vibration and lending lateral support to the vehicle to thereby prevent the vehicle from tumbling while taking a turn.

BACKGROUND

There is always a likelihood that a conventional vehicle will tumble while making a turn, for various reasons, such as speeding and a slippery road. The conventional vehicle making a turn maintains its balance mainly by the friction between the road surface and the wheels.

Accordingly, it is imperative to provide a suspension mechanism capable of protecting a vehicle against vibration and lending lateral support to the vehicle to thereby prevent the vehicle from tumbling while taking a turn.

SUMMARY

In view of the aforesaid drawbacks of the prior art, the inventor of the present invention conducted extensive researches and experiments according to the inventor's years of experience in the related industry, and finally developed a suspension mechanism capable of protecting a vehicle against vibration and lending lateral support to the vehicle to thereby prevent the vehicle from tumbling while taking a turn.

In order to achieve the above and other objectives, the present invention provides a suspension mechanism, comprising: a left external barrel provided with an upper end having a left port and a lower end having a left damper port and pivotally connected to a chassis; a right external barrel provided with an upper end having a right port and a lower end having a right damper port and pivotally connected to the chassis; a left damper with a lower end pivotally connected to left wheel support unit pivotally connected to the chassis, wherein an outer wall surface at an upper portion of the left damper movably abuts against an inner wall surface at a lower portion of the left external barrel through the left damper port, wherein a left adjustable space is defined inside the upper portion of the left external barrel, adapted to be in communication with the left port, and filled with oil; a right damper with a lower end pivotally connected to right wheel support unit pivotally connected to the chassis, wherein an outer wall surface at an upper portion of the right damper movably abuts against an inner wall surface at a lower portion of the right external barrel through the right damper port, wherein a right adjustable space is defined inside the upper portion of the right external barrel, adapted to be in communication with the right port, and filled with oil; and a control valve connected between the left port and the right port to control a flow of the oil.

As regards the suspension mechanism, two opposing sides of the left external barrel and two opposing sides of the right external barrel have a shaft each and thereby are pivotally connected to the chassis.

As regards the suspension mechanism, the shafts each have a shaft cap and a fixing shaft, wherein the fixing shafts are each fixed to the two opposing sides of the left external barrel and the two opposing sides of the right external barrel and pivotally disposed in the shaft caps, respectively.

Accordingly, the suspension mechanism of the present invention is capable of protecting a vehicle against vibration and lending lateral support to the vehicle to thereby prevent the vehicle from tumbling while taking a turn.

BRIEF DESCRIPTION

Objectives, features, and advantages of the present invention are hereunder illustrated with specific embodiments in conjunction with the accompanying drawings, in which.

DETAILED DESCRIPTION

Figure 1:
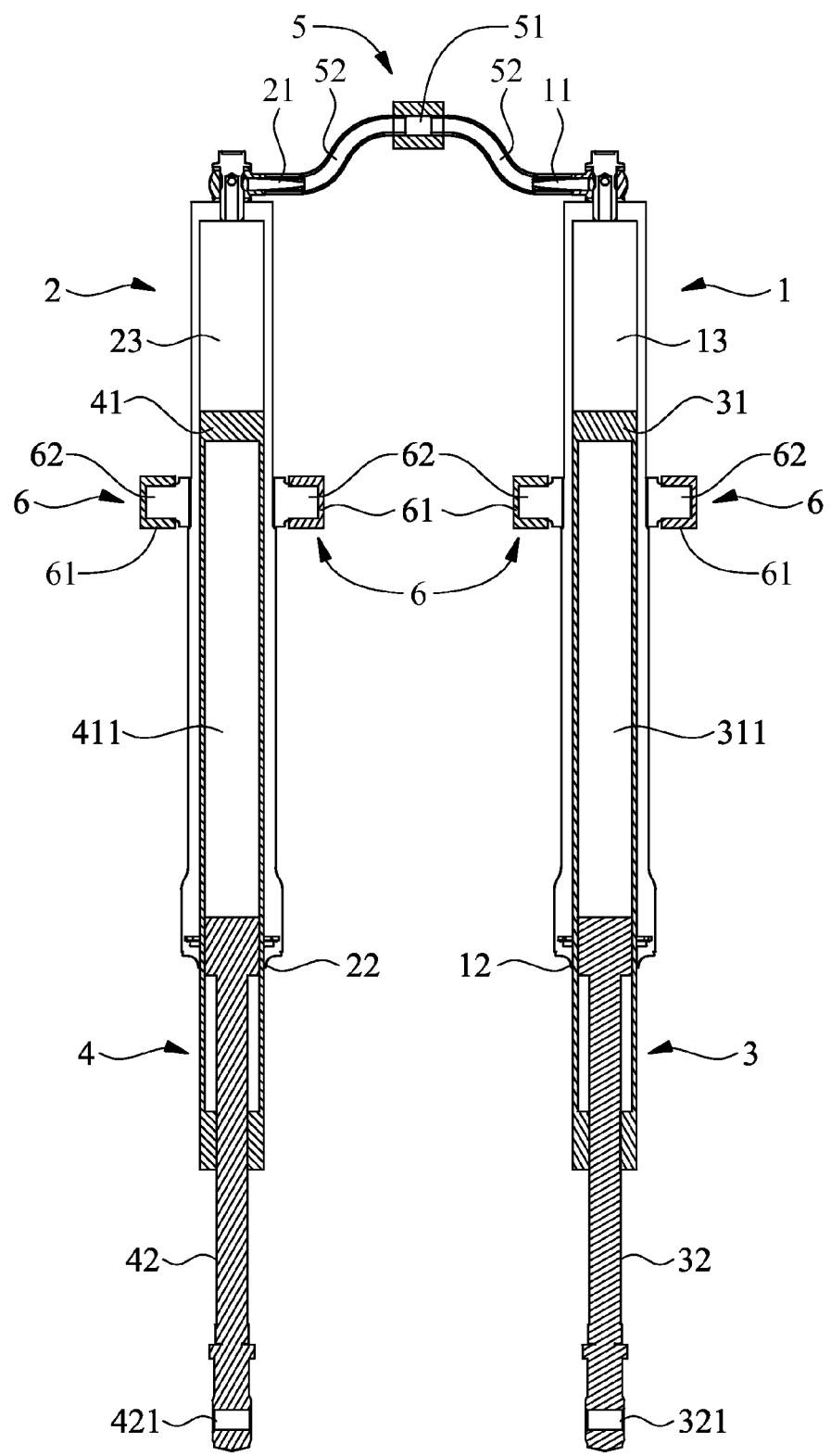
FIG. 1 is a cross-sectional view of a preferred embodiment of the present invention.
Figure 2:
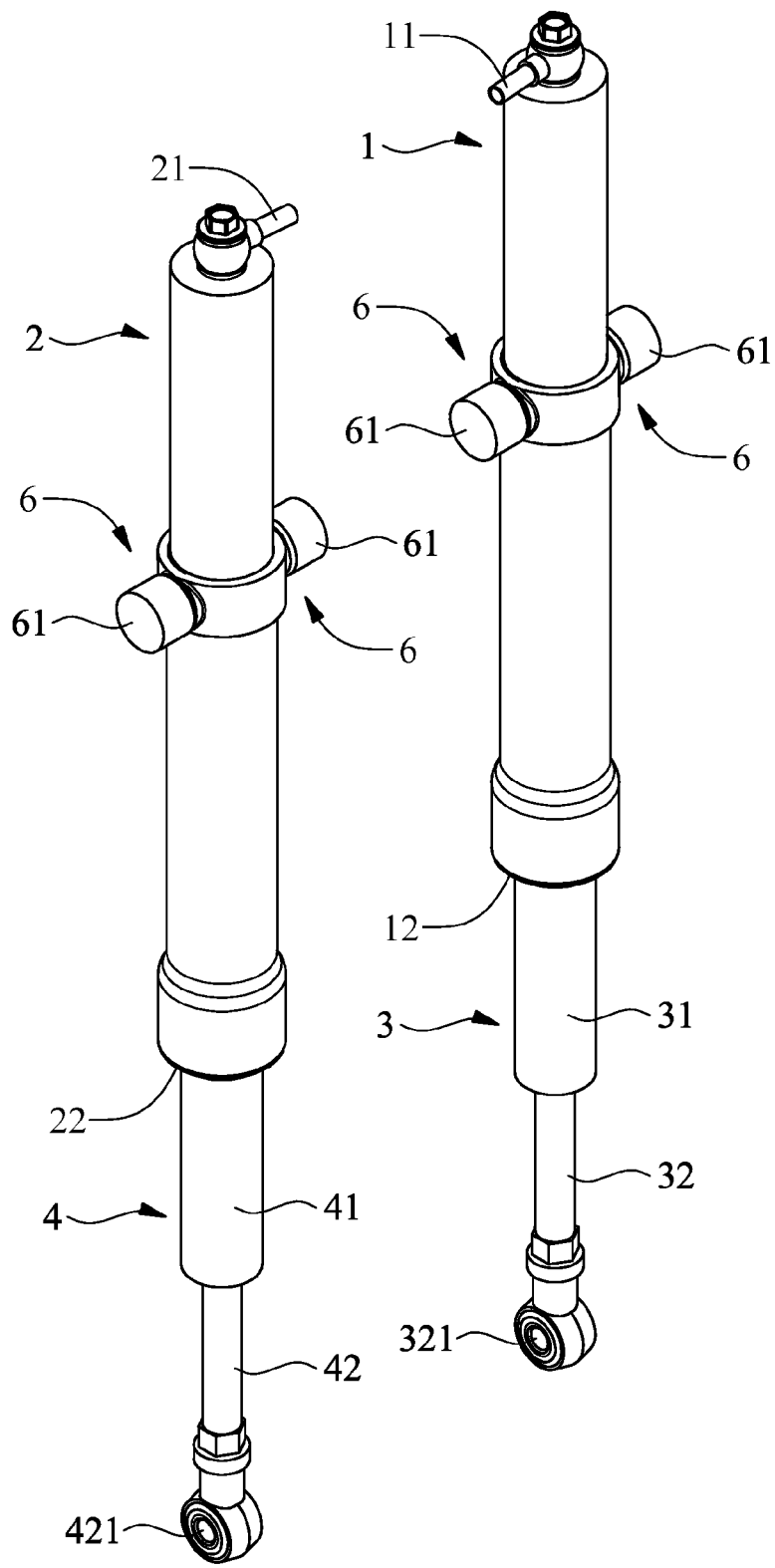
FIG. 2 is a perspective view of the preferred embodiment of the present invention.
Figure 3:
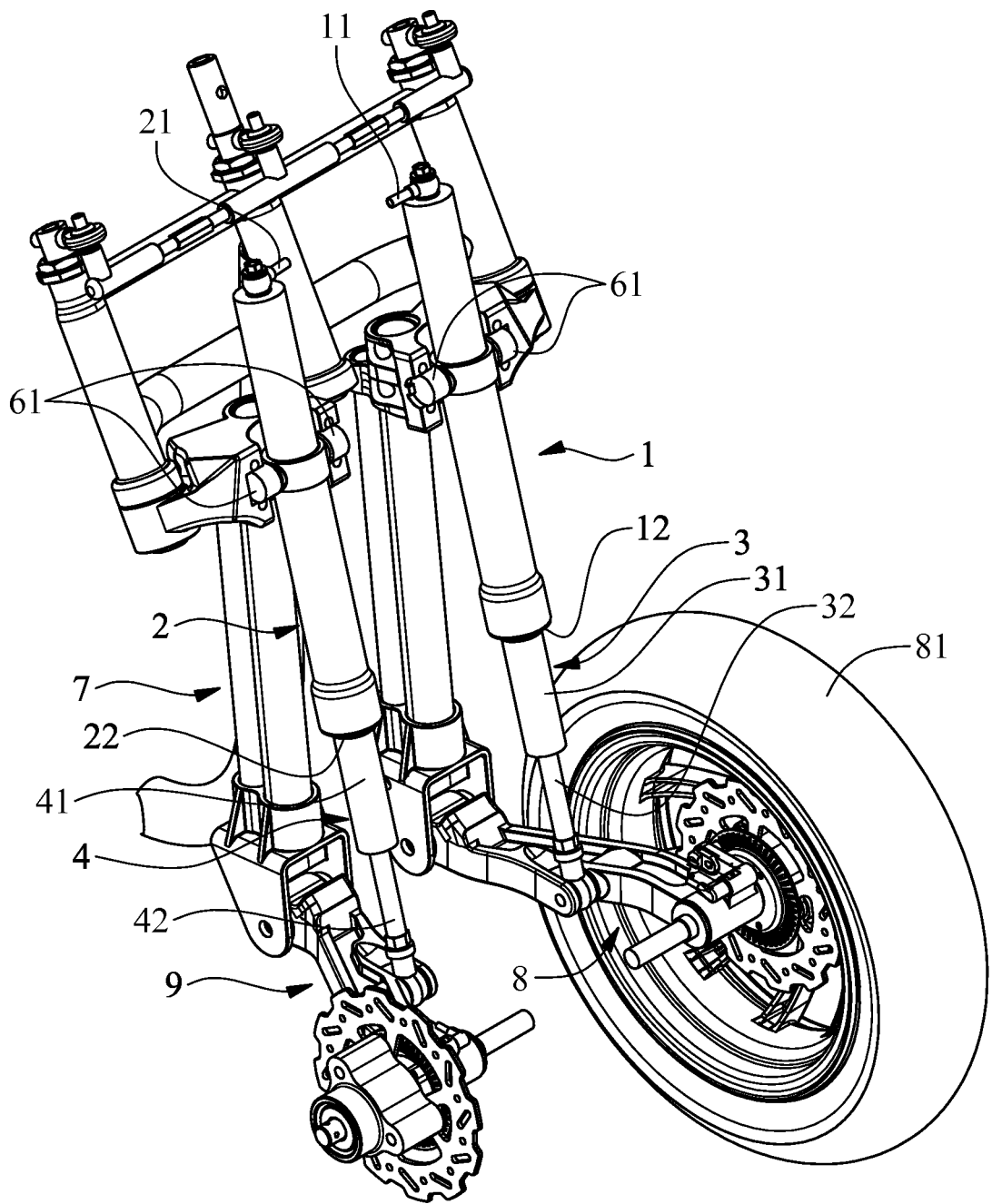
FIG. 3 is a schematic view of the operation of the preferred embodiment of the present invention.

Referring to FIG. 1 through FIG. 3, the present invention provides a suspension mechanism which comprises a left external barrel 1, a right external barrel 2, a left damper 3, a right damper 4, and a control valve 5. As shown in FIG. 1 through FIG. 3, the suspension mechanism of the present invention is for use with the front wheels of a vehicle. However, in practice, the suspension mechanism of the present invention can also be for use with the rear wheels of a vehicle. The upper end of the left external barrel 1 has a left port 11. The left port 11 is a port at one end of a L-shaped pipe. A port at the other end of the L-shaped pipe is in communication with the upper end of the left external barrel 1. The lower end of the left external barrel 1 has a left damper port 12. A chassis 7 is pivotally connected between the two ends of the left external barrel 1. The radial cross-section of the left external barrel 1 is round or of any other geometrical shape. The upper end of the right external barrel 2 has a right port 21. The right port 21 is a port at one end of a L-shaped pipe. A port at the other end of the L-shaped pipe is in communication with the upper end of the right external barrel 2. The lower end of the right external barrel 2 has a right damper port 22. The chassis 7 is pivotally connected between the two ends of the right external barrel 2. The radial cross-section of the right external barrel 2 is round or of any other geometrical shape. The left damper 3 has the same structure and operation mechanism as a conventional damper. The left damper 3 has a left barrel 31 and a left retractable rod 32. The left retractable rod 32 is capable of protruding from and retracting into the left barrel 31. A left receiving space 311 defined by and between the left barrel 31 and the left retractable rod 32 is filled with oil. The lower end of the left retractable rod 32 has a left pivotal connection hole 321 so as to be pivotally connected between two ends of a left wheel support unit 8. One end of the left wheel support unit 8 is pivotally connected to the chassis 7. The other end of the left wheel support unit 8 is pivotally connected to a left wheel 81. The outer wall surface at the upper portion of the left barrel 31 movably abuts against the inner wall surface at the lower portion of the left external barrel 1 through the left damper port 12. A left adjustable space 13 is defined by the top and lateral wall surfaces inside the upper portion of the left external barrel 1 and the outer top wall surface of the left damper 3. The left adjustable space 13 is in communication with the left port 11 and filled with oil. The left adjustable space 13 and the left receiving space 311 are independent of each other but are not in communication with each other, and thus it is impossible for the oil inside the left adjustable space 13 to come into contact with the oil inside the left receiving space 311. A left spring (not shown) fits around the left damper 3. One end of the left spring is fixed to the lower portion of the left barrel 31. The other end of the left spring is fixed to the left retractable rod 32. The right damper 4 is identical to a conventional damper in terms of structure and operation mechanism. The right damper 4 has a right barrel 41 and a right retractable rod 42. The right retractable rod 42 is capable of protruding from and retracting into the right barrel 41. A right receiving space 411 is defined by and between the right barrel 41 and the right retractable rod 42 and filled with oil. The lower end of the right retractable rod 42 has a right pivotal connection hole 421 so as to be pivotally connected between the two end of a right wheel support unit 9. One end of the right wheel support unit 9 is pivotally connected to the chassis 7. The other end of the right wheel support unit 9 is pivotally connected to a right wheel (not shown). The outer wall surface at the upper portion of the right barrel 41 movably abuts against the inner wall surface of the lower portion of the right external barrel 2 through the right damper port 22. A right adjustable space 23 is defined by the top and lateral wall surfaces inside the upper portion of the right external barrel 2 and the outer top wall surface of the right damper 4. The right adjustable space 23 is in communication with the right port 21 and filled with oil. The right adjustable space 23 and the right receiving space 411 are independent of each other but are not in communication with each other, and thus it is impossible for the oil inside the right adjustable space 23 to come into contact with the oil inside the right receiving space 411. A right spring (not shown) fits around the right damper 4. One end of the right spring is fixed to the lower portion of the right barrel 41. The other end of the right spring is fixed to the right retractable rod 42. The two sides of the control valve 5 are connected to the left port 11 and the right port 21, respectively, through a connection pipe 52 each. Hence, the control valve 5, the connection pipes 52, the left adjustable space 13 and the right adjustable space 23 are in communication with each other and filled with oil. Furthermore, the control valve 5 has therein an adjustable communication opening 51 for controlling the oil.

Referring to FIG. 1 through FIG. 3, the adjustable communication opening 51 of the control valve 5 closes to prevent the oil from flowing while the vehicle is moving forward. At this point in time, since the control valve 5, the connection pipes 52, the left adjustable space 13 and the right adjustable space 23 are filled with the oil, both the left adjustable space 13 and the right adjustable space 23 are positioned at the same height because of the oil, so as to lend lateral support to the vehicle moving forward.

The adjustable communication opening 51 of the control valve 5 opens as soon as the vehicle takes a right turn. Since the vehicle taking a right turn always tilts rightward in order to balance itself, the right external barrel 2 presses on the right damper 4; at this point in time, since the adjustable communication opening 51 of the control valve 5 has opened, the right barrel 41 of the right damper 4 exerts an upward thrust on part of the oil in the right adjustable space 23 such that part of the oil is delivered to the left adjustable space 13 through the right port 21, the connection pipe 52 on the right, the adjustable communication opening 51 of the control valve 5, the connection pipe 52 on the left, and the left port 11, and in consequence the right adjustable space 23 is lower than the left adjustable space 13, causing the vehicle to tilt rightward to thereby prevent the vehicle from tumbling while taking a right turn. As indicated above, the vehicle is unlikely to tumble while taking a right turn, because the suspension mechanism of the present invention lends lateral support to the vehicle while the vehicle is taking a right turn. In addition, the suspension mechanism of the present invention is characterized in that the adjustable communication opening 51 of the control valve 5 controls how fast the vehicle tilts rightward such that the more widely the adjustable communication opening 51 of the control valve 5 opens, the faster the oil flows, and the faster the vehicle tilts rightward.

The adjustable communication opening 51 of the control valve 5 opens as soon as the vehicle takes a left turn. Since the vehicle taking a left turn always tilts leftward in order to balance itself, the left external barrel 1 presses on the left damper 3; at this point in time, since the adjustable communication opening 51 of the control valve 5 has opened, the left barrel 31 of the left damper 3 exerts an upward thrust on part of the oil in the left adjustable space 13 such that part of the oil is delivered to the right adjustable space 23 through the left port 11, the connection pipe 52 on the left, the adjustable communication opening 51 of the control valve 5, the connection pipe 52 on the right, and the right port 21, and in consequence the left adjustable space 13 is lower than the right adjustable space 23, causing the vehicle to tilt leftward to thereby prevent the vehicle from tumbling while taking a left turn. As indicated above, the vehicle is unlikely to tumble while taking a left turn, because the suspension mechanism of the present invention lends lateral support to the vehicle while the vehicle is taking a left turn. In addition, the suspension mechanism of the present invention is characterized in that the adjustable communication opening 51 of the control valve 5 controls how fast the vehicle tilts leftward such that the more widely the adjustable communication opening 51 of the control valve 5 opens, the faster the oil flows, and the faster the vehicle tilts leftward.

As indicated above, the suspension mechanism of the present invention is capable of protecting a vehicle against vibration by the left damper 3 and the right damper 4 and preventing the vehicle from tumbling by the control valve 5, the left adjustable space 13 and the right adjustable space 23 while the vehicle is driven up and down a road.

Referring to FIG. 1 through FIG. 3, the suspension mechanism of the present invention is advantageously characterized in that two shafts 6 are disposed on two opposite sides between the two ends of the left external barrel 1 and pivotally connected to the chassis 7, respectively, and two other shafts 6 are disposed on two opposite sides between the two ends of the right external barrel 2 and pivotally connected to the chassis 7, respectively. Hence, the chassis 7 can be easily connected to the suspension mechanism of the present invention.

Referring to FIG. 1 through FIG. 3, the suspension mechanism of the present invention is also advantageously characterized in that the shafts 6 each have a shaft cap 61 and a fixing shaft 62. The fixing shafts 62 are fixed to the two opposite sides between the two ends of the left external barrel 1, fixed to the two opposite sides between the two ends of the right external barrel 2, and disposed pivotally inside the shaft caps 61, respectively. Hence, the suspension mechanism of the present invention can be easily connected to the shaft caps 61 and the chassis 7.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A suspension mechanism, comprising:
a left external barrel provided with an upper end having a left port and a lower end having a left damper port and pivotally connected to a chassis;
a right external barrel provided with an upper end having a right port and a lower end having a right damper port and pivotally connected to the chassis;
a left damper with a lower end pivotally connected to left wheel support unit pivotally connected to the chassis, wherein an outer wall surface at an upper portion of the left damper movably abuts against an inner wall surface at a lower portion of the left external barrel through the left damper port, wherein a left adjustable space is defined inside an upper portion of the left external barrel, adapted to be in communication with the left port, and filled with oil wherein the left damper has a left barrel and a left retractable rod, the left retractable rod is capable of protruding from and retracting into the left barrel, a left receiving space defined by and between the left barrel and the left retractable rod is filled with oil, the outer wall surface at the upper portion of the left barrel movably abuts against the inner wall surface at the lower portion of the left external barrel through the left damper port, the left adjustable space is defined by a top and lateral wall surfaces inside the upper portion of the left external barrel and an outer top wall surface of the left damper, the left adjustable space and the left receiving space are independent of each other but are not in communication with each other;
a right damper with a lower end pivotally connected to right wheel support unit pivotally connected to the chassis, wherein an outer wall surface at an upper portion of the right damper movably abuts against an inner wall surface at a lower portion of the right external barrel through the right damper port, wherein a right adjustable space is defined inside an upper portion of the right external barrel, adapted to be in communication with the right port, and filled with oil wherein the right damper has a right barrel and a right retractable rod, the right retractable rod is capable of protruding from and retracting into the right barrel, a right receiving space defined by and between the right barrel and the right retractable rod is filled with oil, the outer wall surface at the upper portion of the right barrel movably abuts against the inner wall surface at the lower portion of the right external barrel through the right damper port, the right adjustable space is defined by a top and lateral wall surfaces inside the upper portion of the right external barrel and an outer top wall surface of the right damper, the right adjustable space and the right receiving space are independent of each other but are not in communication with each other; and
a control valve connected between the left port and the right port to control a flow of the oil.

2. The suspension mechanism of claim 1, wherein two opposing sides of the left external barrel and two opposing sides of the right external barrel have a shaft each and thereby are pivotally connected to the chassis.

3. The suspension mechanism of claim 2, wherein the shafts each have a shaft cap and a fixing shaft, wherein the fixing shafts are each fixed to the two opposing sides of the left external barrel and the two opposing sides of the right external barrel and pivotally disposed in the shaft caps, respectively.

* * * * *